UNITED STATES PATENT OFFICE.

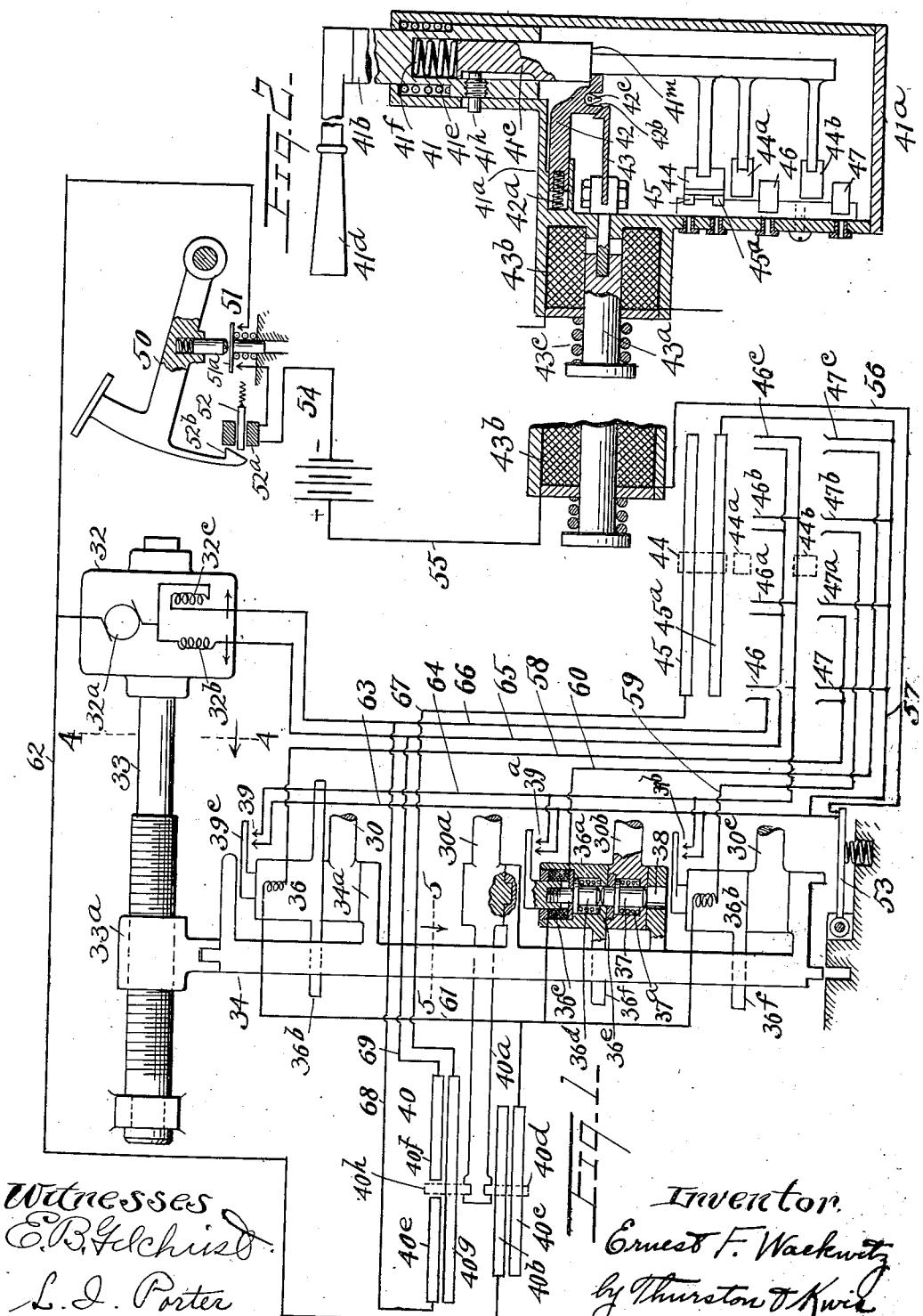

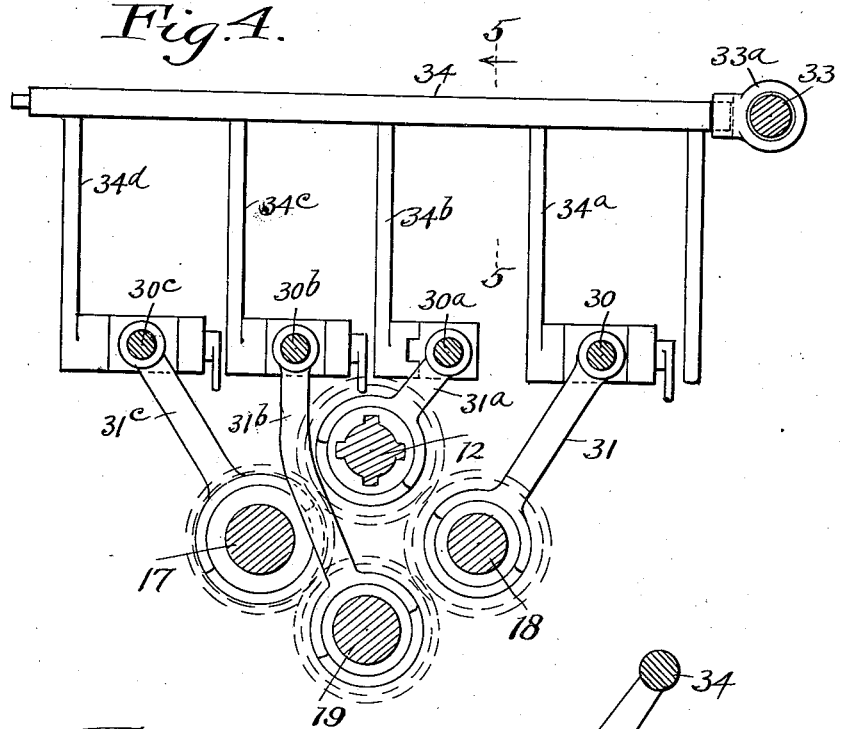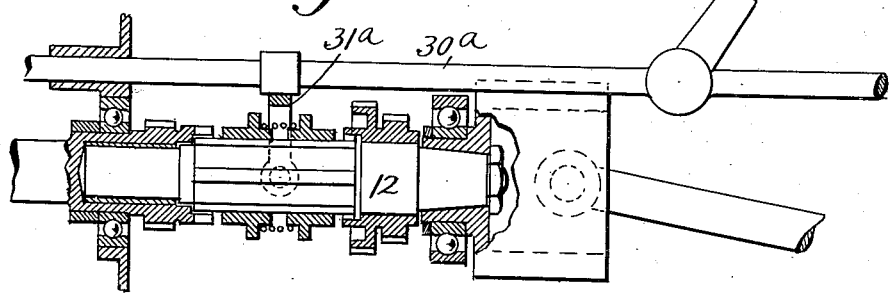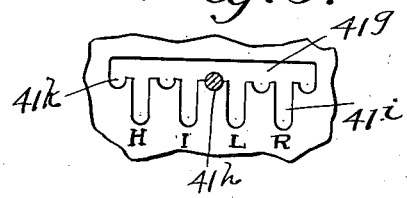

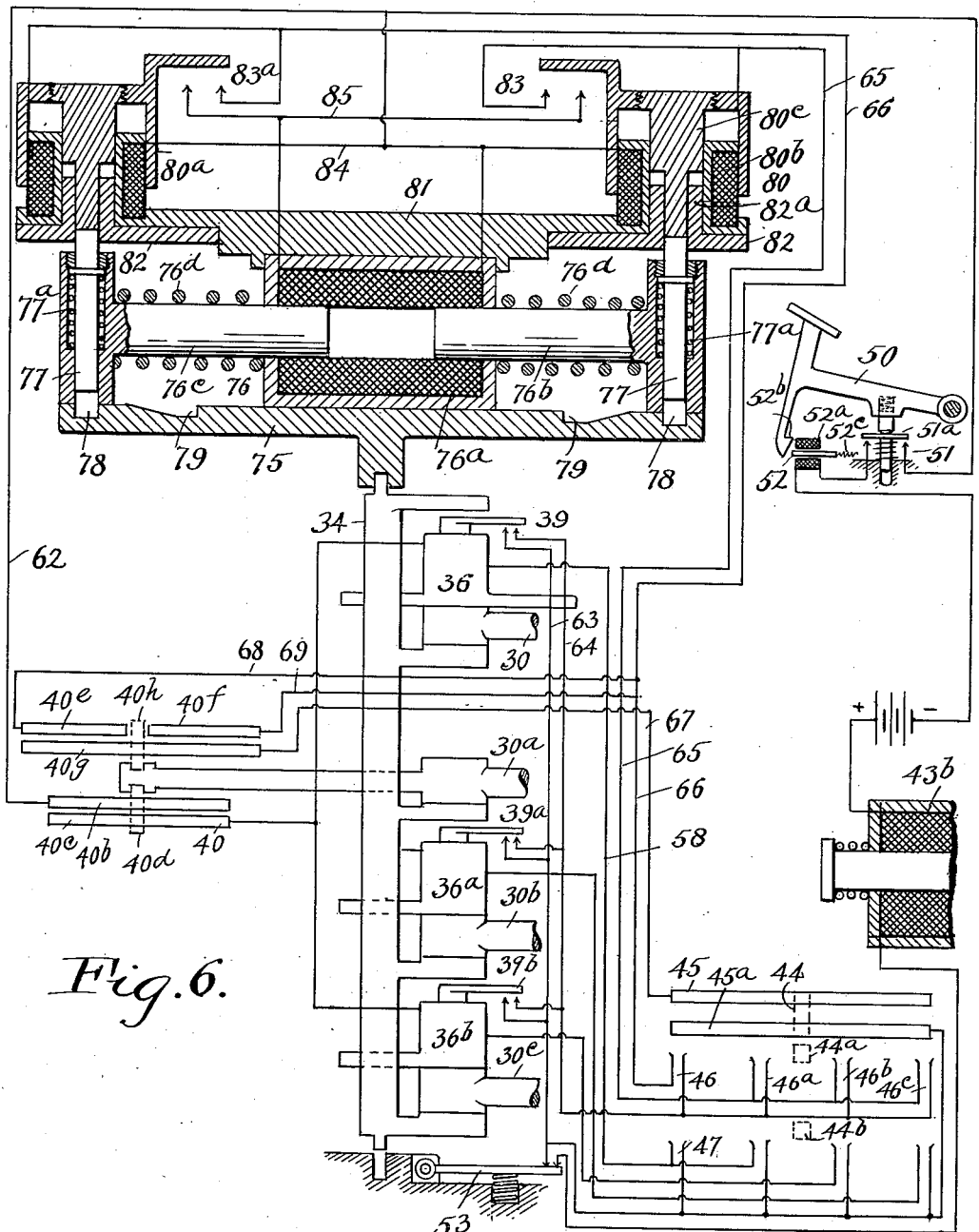

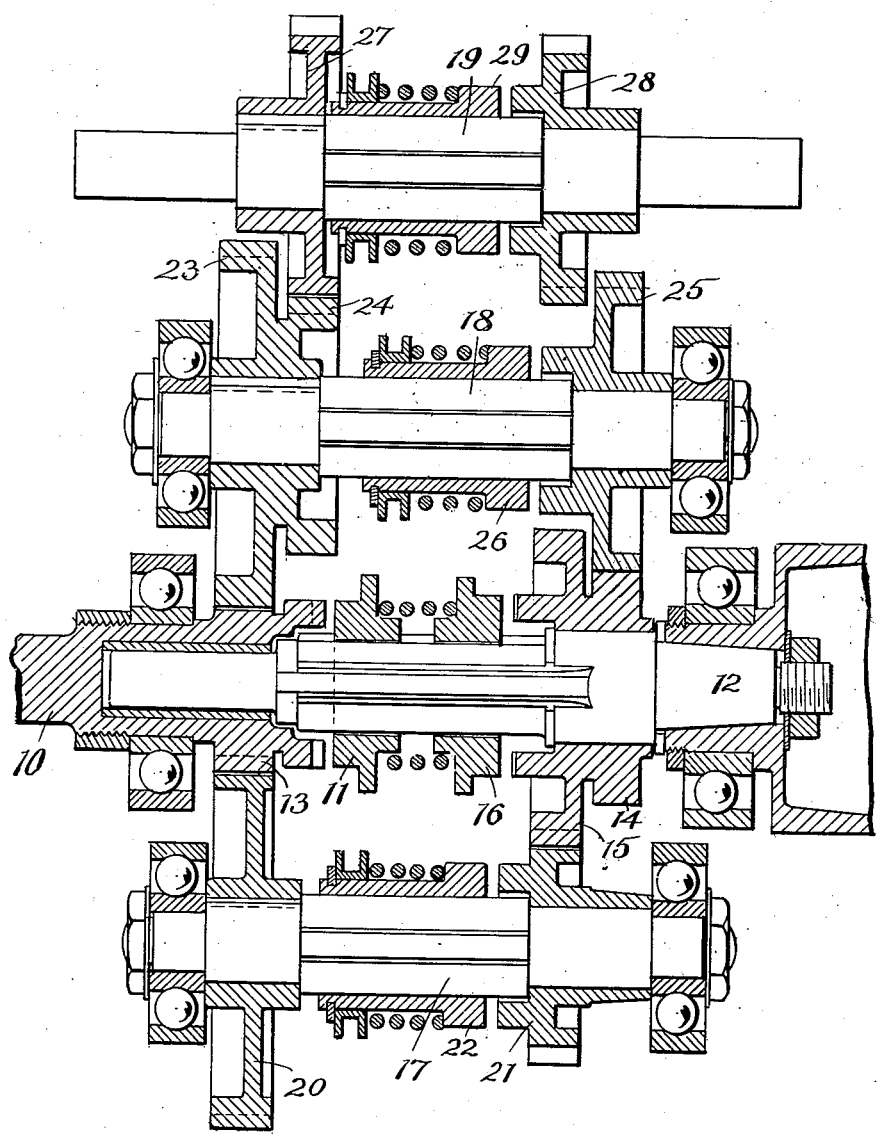

ERNEST F. WACKWITZ, OF CLEVELAND, OHIO, ASSIGNOR TO THE PEERLESS MOTOR CAR COMPANY, OF CLEVELAND, OHIO, A CORPORATION OF OHIO.

ELECTRICALLY-CONTROLLED TRANSMISSION.

1,304,636.     Specification of Letters Patent.     Patented May 27, 1919.

Application filed May 26, 1913. Serial No. 769,801.

*To all whom it may concern:*

Be it known that I, ERNEST F. WACKWITZ, a citizen of the United States, residing at Cleveland, in the county of Cuyahoga and State of Ohio, have invented a certain new and useful Improvement in Electrically-Controlled Transmission, of which the following is a full, clear, and exact description.

This invention relates to electrically operated variable speed transmissions, adapted particularly for use in connection with motor driven vehicles wherein changes in speeds and direction of drive is obtained by changing the gears which transmit power between the main driving and driven shafts.

The object of the invention is to provide an efficient and reliable system of control by which the changes required to effect the different speeds forward or reverse is accomplished electrically, and which responds to the simple manipulation of a controller to shift or cause to be shifted quickly and positively the elements required to bring about such changes.

In carrying out my invention, I utilize some form of motor, such as a magnet or ordinary rotary motor for shifting the different power transmitting elements of the transmission and provide, in addition, a selecting mechanism by which the elements which are to be shifted are connected to a motor driven member. A suitable controller is provided having positions corresponding to neutral and to the different speed changes both forward and reverse, and through the instrumentality of this controller, the different selections are made, followed by the shifting of the selected elements in such a way that all the functions are performed which are now performed with the hand operated and controlled transmissions. In other words, the change may be made from neutral to any speed forward or reverse; from any speed forward or reverse to neutral; or from one speed to another, the selecting and shifting parts of the controlling and operating system responding quickly to the movements of the controller to bring about the selected change.

My invention may be further briefly summarized as consisting in certain novel details of construction and combinations and arrangements of parts which will be described in the specification and set forth in the appended claims.

In this case I have applied the broad principle or features of my invention to a transmission commonly known as the all-in-mesh type, wherein the different gears are all and at all times in mesh, and wherein different combinations of gears are thrown into driving relationship by suitable clutches, which are adapted to clutch the gears to the shafts on which the gears are mounted. However, as far as the broad features of my invention are concerned, I regard it as immaterial, whether the system embodying my invention is applied to a transmission of the all-in-mesh type, or of the type wherein the gears themselves are shifted into and out of engagement with other gears.

In the accompanying sheet of drawings, Figure 1 is a diagrammatic view, showing the electrical connections and the different parts of the transmission control and operating system embodying my invention; Fig. 2 is a view partly in side elevation, and partly in section of the controller; Fig. 3 is a development of a portion of the controller; Fig. 4 is a view partly diagrammatic and partly in section along the line 4—4 of Fig. 1, showing the relation of the selecting and clutch shifting parts of the apparatus in association with part of the clutches and gears of transmission gearing of the type above specified; Fig. 5 is a view partly in elevation and partly in section along the line 5—5 of Fig. 4, of a portion of the transmission, and showing the motor driven member which shifts the clutches and part of the apparatus between such member and the transmission; Fig. 6 is a view similar to Fig. 1, illustrating a modification in the type of motor which shifts the clutches; Fig. 7 is a development with parts in section and other parts in elevation of the principal parts of the transmission including the gearing, clutches and shaft to which my invention is applied, as shown and described in this case.

Before describing the parts with which my invention is immediately concerned, I wish to briefly describe the transmission which *per se* forms no part of the present invention, and to this end reference is had particularly to Figs. 4 and 7. The transmission includes a driving shaft 10 which will be connected to the motor or prime mover in the usual manner, and which is adapted to be connected by a clutch or clutch member 11 to a driven shaft 12, which may be regarded as part of the propeller shaft and may be connected in the usual and well known manner to the rear axle of a motor vehicle. Shaft 10 carries a fixed gear 13, and shaft 12 is provided with two gears 14 and 15 which are normally loose on the shaft, but may be clutched thereto by a clutch member 16. The transmission includes also three countershafts 17, 18, and 19 which may be termed respectively, the low speed, the intermediate and the reverse shafts. Shaft 17 carries a fixed gear 20 which meshes with the gear 13, and also a normally loose gear 21 which meshes with the gear 15 and is designed to be clutched to the shaft 17 by a clutch member 22. Shaft 18 is provided with three gears including gears 23, 24 and 25.

The gears 23 and 24 are fixed to the shaft, and the gear 23 meshes with the gear 13, while the gear 25 is loose on the shaft 18, and may be clutched thereto by a clutch member 26. The shaft 19 is provided with two gears, including a fixed gear 27 which meshes with the gear 24, and a normally loose gear 28 and may be clutched to the shaft 19 by a clutch member 29.

In the development shown in Fig. 7 the gear 28 is not shown as engaging the gear 15, but when the shafts above described are in their proper relative arrangement shown in Fig. 4, this engagement is had.

Arranged above and parallel to the shafts 12, 17, 18 and 19 are four clutch shifting rods 30, 30$^a$, 30$^b$, and 30$^c$. The shifter rod 30 is provided with a clutch arm or yoke 31 which is adapted to shift the clutch member 26 to clutch the gear 25 to the shaft 18. Shifter rod 30$^a$ is provided with a clutch yoke 31$^a$ which is adapted to shift the clutch members 11 and 16, to clutch the shafts 10 and 12 directly together, or to clutch the gears 14 and 15 to the shaft 12. Shifter rod 30$^b$ is provided with a clutch yoke 31$^b$ which is adapted to shift the clutch member 29 to clutch the gear 28 to the shaft 19, and shifter rod 30$^c$ is provided with a clutch yoke 31$^c$ which is adapted to shift the clutch member 22 to clutch the gear 21 to the shaft 17.

When certain pairs or combinations of shifter rods are moved endwise, the gears are clutched to the corresponding shafts for low and intermediate forward speeds or reverse drive, or the shafts 10 and 12 are clutched together for high speed.

It may be here stated that shifter rods 30$^a$ and 30$^c$ are moved endwise to the right (as they would be viewed if shown in Fig. 7), for low speed forward; shifter rods 30$^a$ and 30 are shifted in the same direction for intermediate speed forward; shifter rods 30$^a$ and 30$^b$ are shifted in the same direction for reverse, and shifter rod 30$^a$ is shifted to the left for high speed. For high speed, none of the gears are in use for the transmission of power, as the shafts 10 and 12 are directly clutched together, and for securing high speed, it will be necessary only to shift the rod 30$^a$ in the direction above stated, but as a matter of convenience, as will be hereinafter explained, when the rod 30$^a$ is shifted to the left, one of the other shifter rods is likewise shifted in the same direction, but the movement of the second shifter rod does not in itself result in any clutching action for high speed. For all other speeds, however, it is essential that the shifter rods be shifted in pairs, as above described.

In accordance with my invention, the proper shifter rods are adapted to be shifted in the desired direction by motive means which in the construction shown in Figs. 1, 4 and 5, consists of a rotary reversible motor 32 which is provided with an armature 32$^a$ shown diagrammatically in Fig. 1, and two oppositely or differentially wound field windings 32$^b$ and 32$^c$. The motor drives a threaded shaft 33 which is engaged by a traveling nut 33$^a$ which is adapted to be connected to a shifter rod operating bar 34, which is provided with four downwardly extending arms 34$^a$, 34$^b$, 34$^c$, and 34$^d$, which extend downwardly in proximity to and are adapted to be connected to the shifter rods 30, 30$^a$, 30$^b$ and 30$^c$ respectively.

As before explained, when the clutch or clutches are shifted for any change from or to neutral position, the shifter rod 30$^a$ is operated. Hence this shifter rod may and preferably is at all times connected to the corresponding arm 34$^b$ as shown in Figs. 1 and 4. Each of the other shifter rods is normally disconnected from the corresponding shifter bar arm, but may be connected thereto by selecting and locking mechanism which forms an important part of my invention.

By reference particularly to Fig. 1, wherein the parts are shown in neutral position, it will be seen that at the lower end of each of the shifter bar arms 34$^a$, 34$^c$ and 34$^d$ is a boss which is normally adjacent to a boss on the end of the corresponding shifter rod. The mechanism controlling the locking engagement between each of the shifter rods 30, 30$^b$ and 30$^c$ with the corresponding arms is the same, and hence the description and illustration in detail of the mechanism for one of these shifter rods, applies to all three.

The selective locking of the shifter bar 34 or of the arms extending therefrom with the three shifter rods 30, 30$^b$ and 30$^c$ is controlled by three selecting solenoids 36, 36$^a$ and 36$^b$, which are arranged in housings in fixed position adjacent the ends of the three shifter rods, and adjacent the ends of the three arms connected to the shifter bar, as will be observed from Fig. 1. The end of each of the three shifter rods is between the housing of the solenoid and the end of the corresponding shifter bar arm. Each solenoid includes a coil or solenoid winding 36$^c$, and a plunger or armature 36$^d$ which is normally held by a coil spring 36$^e$ away from or out of engagement with the end of the corresponding shifter rod. In the end of each of the three shifter rods and movable in a suitable socket provided therein is a locking pin 37 which is pressed toward the plunger 36$^d$ and normally projects slightly into the housing of the solenoid by a coil spring 37$^a$ surrounding the pin 37. In the end of the shifter bar arm there is an opening or socket 38, into which the corresponding locking pin 37 is adapted to be moved by the plunger of the solenoid to effect locking connection between the shifter rod and the shifter bar arm. The axes of the plunger 36$^d$, of the locking pin 37, and of the opening 38, are in alinement in neutral position of the transmission, and the opening 38 is of such a size that the pin will enter the same when the pin is shifted by the plunger of the solenoid upon the energization of the latter.

It will be observed that each of the housings of the solenoids 36$^a$ and 36$^b$ is provided with a guide flange 36$^f$, which extends parallel to and in the direction of movement of the shifter rods 30$^b$ and 30$^c$. These flanges prevent the pins 37 from moving out of the openings 38 in the shifter bar arms until after the shifter rods are again returned to normal or neutral position, i. e., with the pins 37 in alinement with the solenoid plungers. The housing of solenoid 36 is provided with two of such flanges 36$^f$ extending parallel to the shifter rod 30 in both directions from the housing. The two flanges are required with this solenoid for the reason that, as will be explained presently, the shifter rod is adapted to be moved both to the right and to the left from normal position.

The three solenoids in addition to serving to effect locking engagement of the shifter rods with the corresponding shifter bar arms, operate motor circuit selecting switches 39, 39$^a$ and 39$^b$, each of which includes a movable switch member 39$^c$, which is connected to and moves with the plunger of the corresponding solenoid. As will be explained presently, one of these switches is closed whenever the controller handle is moved from neutral position to any speed position so as to close the motor circuit.

The motor controlling apparatus includes also a travel limiting switch 40 which opens the motor circuit when the motor has moved the shifter bar a predetermined distance in one direction or the other. This switch includes an arm 40$^a$ which is carried by the shifter rod 30$^a$. This switch includes also a pair of stationary adjacent contact strips 40$^b$ and 40$^c$ which are adapted to be bridged by a movable contact 40$^d$ carried by the switch arm, and it includes still further three additional adjacent contact strips 40$^e$, 40$^f$, and 40$^g$. The strips 40$^e$ and 40$^f$ are arranged end to end with a space between them and each of these strips is adapted to be connected to the strip 40$^g$ by a movable contact 40$^h$, likewise carried by the switch arm. These parts are so arranged that when the shifter rod 30$^a$ is in neutral position, contact strips 40$^b$ and 40$^c$ are connected together by contact 40$^d$ which rides off said contact so as to break the motor circuit (as will be hereinafter explained) after the required length of travel of the shifter bar in either direction. The contact strips 40$^e$, 40$^f$, and 40$^g$ are so arranged that the contact 40$^h$ connects one or the other of the strips 40$^e$ or 40$^f$ to the contact strips 40$^g$, when the shifter rod 30$^a$ is moved from neutral position, even after the contact 40$^d$ rides off of the strips 40$^b$ and 40$^c$, and said contact 40$^h$ disconnects the strip 40$^g$ from the strips 40$^e$ or 40$^f$ so as to break the motor circuit by passing into the space between the strips 40$^e$ and 40$^f$ when neutral position is reached.

I wish now to describe the construction of controller 41 which controls the circuits with the coöperation of the clutch pedal switch, to be hereinafter referred to. The controller 41 includes a suitable casing 41$^a$ and a movable controller member including two relatively movable parts 41$^b$ and 41$^c$. The former may be termed the controller handle, and is provided at its lower end with a socket which receives the end of the controller member 41$^c$ which for convenience of description will be termed the controller drum. The movable controller member composed of the two parts, is capable of rotary movement and endwise or vertical movement (assuming for convenience of description that the controller is arranged in a vertical position) and the two parts being telescopically arranged, are capable of relative endwise movement. It will be observed that the controller handle 41$^b$ is normally pressed down or inward by a coil spring 41$^e$, and that the controller drum 41$^c$ is normally urged downward or inward away from the part 41$^b$ by a coil spring 41$^f$ arranged at the base of the socket, so as to bear against the end of the drum.

The controller handle has a range of movement, both vertically and circumferentially, which is controlled by a so-called gate consisting of an irregularly shaped opening 41$^g$ in the wall of the casing of the controller, and adapted to be engaged by the outwardly projecting end of a pin 41$^h$ which is secured in the wall of the socketed end of the handle, and whose inner end projects into an elongated slot in the drum $41^c$. This slot is vertical so that the two parts $41^b$ and $41^c$ may move relatively in a vertical direction, but are constrained to move simultaneously or together when the controller handle is turned.

By referring to the development of the gate shown in Fig. 3, it will be seen that the gate or gate opening includes four slots $41^i$ which are spaced circumferentially, and correspond to the high, intermediate, low and reverse positions of the controller, and are marked respectively H, I, L, and R. The gate also includes a series of notches or smaller slots $41^k$ which are alternately arranged with respect to the slots $41^i$. Each of these slots $41^k$ corresponds to neutral position of the controller. When the controller handle is moved so that the outer end of the pin passes from one of the notches $41^k$ into one of the slots $41^i$, the clutches of the transmission will be actuated so as to bring about a change from neutral to one of the speed positions, depending upon the particular slot in which the pin is inserted. If the controller is moved so that the pin passes from the base of one of the slots $41^i$ into any one of the notches $41^k$, the transmission is changed from the speed position to neutral position. If the controller is moved so that the pin passes from the base of one of the slots $41^i$ to the base of any other of the slots $41^i$, the transmission is changed automatically from the speed corresponding to the first position of the pin to neutral and then to the speed corresponding to the second or last position of the pin.

The functions herein described are dependent on, and act only, in conjunction with the functioning of the switch 51, which is operated by the clutch pedal 50, as hereinafter explained.

It will be observed, however, at this point, that to effect the required change in the transmission, the operator has simply to operate the clutch pedal and to raise the controller handle, and thence to swing the same circumferentially or laterally through a short arc. The spring $41^e$ will serve to lower the pin and the movable parts of the controller downward until the pin reaches the end of the slot.

The drum $41^c$ is of two diameters, and is provided between its ends with an annular shoulder $41^m$ adapted to be engaged by the end of a latch 42, which is carried by the controller housing, and is adapted to be pressed outward by a spring $42^a$ so as to prevent, under certain circumstances, the member $41^c$ of the controller being lowered from its normal upper position. The latch 42 is adapted to be retracted from beneath the shoulder, in a manner to be hereinafter explained, by a spring finger 43 carried by the plunger $43^a$ of the solenoid $43^b$, which solenoid is carried by the controller housing, as shown in Fig. 2. The plunger is adapted to be moved outwardly by a coil spring $43^c$ when the solenoid is deënergized, and to be moved inwardly when the solenoid is energized. The inner part of the latch 42 is provided with a shoulder or notch $42^b$ into which the hook-shaped end of the spring finger 43 is adapted to engage so as to retract the latch upon the deënergization of the solenoid. This notch $42^b$ contains a pivoted wedge shaped member which may be termed a notch filler $42^c$, which at certain times is adapted to prevent the hook of the spring finger 43 from engaging in the notch or against the shoulder thereof, and thus to prevent the finger from retracting the latch. The purpose of these features will be explained in the general description of the operation.

The drum $41^c$ of the controller is provided near its lower end with three laterally projecting fingers carrying three separate contact members which are suitably insulated one from the other, said contacts or contact including an upper contact member 44, an intermediate contact member $44^a$ and a lower contact member $44^b$. These contact members are adapted respectively to engage or to coöperate with three sets or series of stationary contacts which may be termed the upper, middle, and lower sets. The upper series is composed of two long contact strips 45 and $45^a$, which are adapted to be bridged and thus electrically connected by the upper contact member 44, when the controller handle is in neutral position. The middle series of stationary controller contacts consists of four pairs of clips designated 46, $46^a$, $46^b$, and $46^c$, each pair of which is adapted to be engaged by the middle contact member $44^a$. The lower series of stationary controller contacts consists of four pairs of clips 47, $47^a$ $47^b$, and $47^c$. These clips are arranged directly below the corresponding pairs of the middle series, and these two series of clips are so arranged with respect to the contact members $44^a$ and $44^b$ of the controller drum, that when the controller handle is moved from neutral to any one of the speed positions, the intermediate movable controller contact $44^a$ engages two of the clips of middle series, and the lower movable contact member $44^b$ engages two of the clips of the lower series.

Before describing in detail, the various circuit connections, I wish to briefly refer to two switches which are utilized in connection with and coöperate with the controller in establishing various electrical circuits. One of these switches is in the nature of a safety device employed in connection with a clutch pedal which operates the clutch and renders it impossible to change the transmission, unless the clutch is first thrown out by depressing the pedal, and which prevents the clutch being thrown in before the change in the transmission has been effected. This is shown conventionally in Figs. 1 and 6 wherein it will be seen that the clutch pedal 50 when depressed lowers a switch member 51ª of a clutch pedal switch 51 so as to close the latter. When the clutch pedal is raised, a spring raises the switch member 51ª so as to open the switch. To prevent the clutch pedal being raised and the clutch thrown in and the circuits broken at the switch 51, prior to the completion of the motor movement required to effect the change in the transmission, I employ some form of a clutch pedal interlock, which in this case is electrically operated. This consists of a latching solenoid and includes a latch 52, which when the pedal is depressed and the circuits are completed, is adapted to be drawn forwardly by a solenoid coil 52ª, so as to engage over a shoulder 52ᵇ on a projection carried by the clutch pedal. This latch by engaging the shoulder 52ᵇ, prevents the clutch pedal being raised until the circuits are broken by the travel limit switch 40, whereupon the solenoid 52ª is deënergized, and the latch is retracted by a spring 52ᶜ.

In addition to the above, I employ what I term a constant service switch 53, which is closed during the entire time that the electric transmission control is in service, and through which all the circuits are adapted to be made or completed, so that when said switch is opened, all the circuits are opened. As before stated, this switch is normally closed, and it is opened only when the entire electric transmission control is out of service, and when the parts of the transmission are adapted to be operated other than electrically, such as by manually operated means, as is used at the present time. In case the electric control should not work properly, or should become inoperative by reason of the breaking of a conductor, or loosening of a connection, the manual transmission operating means can be brought into use, and the electrical operating means can be thrown out of commission by simply disconnecting the shifter rod bar 34 from the traveling nut 33ª, and by disconnecting the same from the several shifter rods, so that they may be freely operated by the manually operable means. It will be observed from Fig. 1 that if the shifter rod bar 34, when in the position shown in said figure is moved endwise, not only is the bar disconnected from the nut, but it opens the constant service switch 53 which is arranged in proximity to one end of the shifter bar, and at the same time the plungers of the three solenoids are moved inwardly, so that the pins 37 carried by the ends of the shifter rods are moved out of the solenoid housings, so as to permit said shifter rods to be operated by manually operable means.

I wish now to describe the electrical connections so that a clear understanding of the operation of the apparatus will be had.

By reference to Fig. 1, it will be observed that the positive side of the battery 54 is connected by conductor 55 to one terminal of the controller solenoid 43ᵇ, and that the other terminal of the solenoid is connected by conductor 56 to the movable member of constant service switch 53. This switch has a terminal which is connected by conductor 57 to one of each of the four pairs of controller contact clips 47, 47ª, 47ᵇ, and 47ᶜ. The other two contacts or clips of the two pairs 47 and 47ª are connected by conductor 58 to one terminal of selecting solenoid 36. The other contacts of the pairs 47ᵇ and 47ᶜ are connected respectively by conductors 59 and 60 to one terminal of the selecting solenoid 36ᵇ, and to one terminal of selecting solenoid 36ª. The other terminals of the three solenoids 36, 36ª and 36ᵇ are connected to a common conductor 61 which is connected to the lower contact strip 40ᶜ of travel limit switch 40. The other coöperating contact strip 40ᵇ of this switch is connected by conductor 62 through the clutch pedal switch 51, and through the locking or latching solenoid 52ª of the clutch pedal to the negative side of the battery.

It will be observed that the terminal of the constant service switch to which the conductor 57 is connected, is connected also by conductor 63 to one terminal of each of three solenoid operated selecting switches 39, 39ª and 39ᵇ. The other terminals 63 of the selecting switches are connected to conductor 64 which it will be observed is connected to one contact or clip of each of the four pairs of stationary controller contacts 46, 46ª, 46ᵇ and 46ᶜ. The remaining contacts of the pairs 46ª, 46ᵇ, and 46ᶜ are connected by a conductor 65 to a motor field winding 32ᵇ, and the remaining or second contact of the pair 46 is connected by conductor 66 to motor field winding 32ᶜ, which as before stated is oppositely wound with respect to the motor field winding 32ᵇ.

Conductor 57, which as before stated, is connected to one terminal of the constant service switch 53, and also to one of each of the four pairs of lower stationary contacts 47, 47ª, 47ᵇ and 47ᶜ, is connected to the lower stationary controller contact strip 45ª, which when the controller handle is in neutral position, is connected by the upper movable controller contact 44 to the coöperating stationary controller contact strip 45. This last named contact strip is connected by a conductor 67 to the lower contact strip 40ᵍ of the upper set of stationary contacts of the travel limit switch 40. The other two contacts 40ᵉ and 40ᶠ of this set are connected respectively by conductors 68 and 69 to conductors 66 and 65 which lead respectively to the motor field windings 32ᶜ and 32ᵇ.

Having now described all the parts of the transmission and controlling mechanism and having described the electric connections, the manner of operation and the various circuits which are established and the manner in which they are established, will now be clearly understood. With the controller handle and transmission in neutral position or condition, all the parts will be as shown in Figs. 1 and 2, except that the latch 42 will be retracted from beneath the shoulder 41ᵐ of the controller drum. If the operator wishes to pass to one of the speed positions, say to low speed, he will raise the controller handle slightly so as to lift the pin 41ʰ out of the particular neutral notch 41ᵏ into which the pin happened to rest, and he will turn the controller handle until the pin is above the slot 41ⁱ, corresponding to the speed and direction of movement desired, and thence will release the controller handle so as to allow the same to be lowered under the action of the spring 41ᵉ. He will, of course, at the same time lower the clutch pedal so as to throw out the clutch, for otherwise the transmission can not be operated.

Assuming that the operator desires to pass from neutral to low speed forward, he will lower the controller pin 41ʰ into slot 41ⁱ marked L in Fig. 3. The two movable controller contacts 44ᵃ and 44ᵇ will thence engage between the clips 46ᵇ and 47ᵇ respectively. By reason of the fact that the contacts 47ᵇ are connected to selecting solenoid 36ᵇ, which will be energized so as to cause the shifter rod 30ᶜ to be locked to the arm of the shifter bar 34, and by reason of the fact that the selecting switch 39ᵇ is closed by the energization of the solenoid 36ᵇ, the motor circuit is completed through motor field winding 32ᵇ, and the motor will start to operate in a forward direction so as to move the shifter rods 30ᶜ and 30ᵃ to the left as the same are viewed in Fig. 1, (thus shifting the clutching members 16 and 22, to the right, as viewed in Fig. 7).

The selecting solenoid circuit is as follows: from the positive side of the battery, through controller solenoid 43ᵇ, by conductor 56 to constant service switch 53, by conductor 57 through clips 47ᵇ and by conductor 59 through the coil of solenoid 36ᵇ, by conductor 61 to contact 40ᶜ of travel limit switch 40, by contact 40ᵈ to contact strip 40ᵇ of switch 40, and by conductor 62 through clutch pedal switch 51, and latching solenoid 52ᵃ to the negative side of the battery.

At the same time, the motor circuit is as follows: from the positive side of the battery through controller solenoid 43ᵇ, by conductor 56 to constant service switch 53ᵇ, by conductor 63 through selecting switch 39ᵇ, by conductor 64 through controller contacts 46ᵇ, by conductor 65, through the field winding 32ᵇ, and armature 32ᵃ of the motor to conductor 62 to which the armature is connected, as shown in Fig. 1, through clutch pedal switch 51, and pedal latching solenoid 52ᵃ to the negative side of the battery. These circuits will remain closed and the motor will continue to operate until traveling contact 40ᵈ of travel limit switch 40 travels to the left off the contact strips 40ᵇ and 40ᶜ. This breaks the circuit of solenoid winding 36ᵇ, causing the selecting switch 39ᵇ to be opened, and the opening of the latter causes the motor circuit to be opened. This will not take place, however, until the clutch members have been moved to clutching position to throw into operation the gears which result in low speed forward.

Upon the opening of the circuit of the selecting solenoid, and of the motor, the pedal latching solenoid is deënergized, after which the clutch will be thrown in either when the operator moves his foot from the clutch pedal; or if he had previously removed his foot from the pedal, the clutch will be thrown in upon the deënergization of the solenoid 52ᵃ.

Prior to the movement of the controller handle from neutral position to low speed position, the latch 42 was in retracted position, so that the drum was permitted to be moved downward to speed position as before stated. However, upon the energization of the controller solenoid 43ᵇ by the movement of the controller drum to the speed position, the solenoid plunger was moved inwardly, and the latch was likewise moved inwardly until the inner end of the latter engaged the controller drum above the shoulder,—in other words, the larger part of the drum shaft. Inasmuch as the latch was thus prevented from moving inwardly its full travel, the hooked portion at the end of the spring finger 43 moved inwardly past the point of the pivoted wedge-shaped notch filler 42ᶜ, and consequently, upon the retraction of said spring finger 43, due to the deënergization of the controller solenoid when its circuit was broken by the travel limit switch 40, the hook at the end of the finger 43 rocked the notch filler to the left, as the same is viewed in Fig. 2, and passed by the shoulder 42ᵇ, without engaging behind the same. Consequently, the latch 42 was left in engagement with the larger part of the controller drum.

When the operator desires to restore the clutches of the transmission to neutral position, he will simply raise the controller handle from speed position, and allow the controller handle pin 41ᵇ to drop into any one of the neutral notches 41ᵏ. When the handle is thus raised, the drum 41ᶜ is raised with it, the contacts 44ª and 44ᵇ are withdrawn from the clips which they previously engaged, and the contact 44 now bridges the contact strips 45 and 45ª. This completes the circuit of the motor through the field winding 32ᶜ and causes the motor to rotate in the reverse direction until its circuit is again broken by the travel limit switch with all parts restored to neutral position.

The circuit of the motor is now as follows: from the positive side of the battery, through the controller solenoid 43ᵇ by conductor 56 to constant service switch 53, by conductor 57 to contact strip 45ª, by contact 44 to the upper contact strip 45, by conductor 67 to contact strip 40ᵍ of limit switch 40, by contact 40ʰ to contact strip 40ᵉ, (said contact 40ʰ having been moved to the left of position shown in Fig. 1, when the contact 40ᵈ rode off of the contact strips 40ᵇ and 40ᶜ, when the circuits were previously broken in the speed position). Thence by conductors 68 and 66, through field winding 32ᶜ and armature 32ª of the motor, by conductors 62, through clutch pedal switch and pedal latching solenoid to the negative side of the battery. The motor now continues to rotate so as to restore the parts to neutral position, and when neutral position is reached, contact 40ʰ of travel limit switch 40 rides off of the contact strip 40ᵉ, whereupon the motor circuit is broken. When this position is reached, the locking pin 37 which previously locked the shifter rod to the arm of the shifter rod bar, rides out of the socket 38, and releases the shifter rod with respect to the corresponding shifter bar arm.

When the controller drum was raised in the manner just described, the inner end of the latch 42 was permitted to move inwardly beneath the shoulder 41ᵐ and to engage the smaller part of the drum. Consequently, upon the energization of the controller solenoid which resulted from moving the controller drum to neutral position, the position of the spring finger was such that the hook or shoulder at the inner end of the finger remained between the shoulder 42ᵇ, and the pin of the notch filler 42ᶜ. Therefore when the solenoid was again deënergized, the latch was retracted with it, or the inner end of the latch was moved from beneath the shoulder 41ᵐ or to the position it was in, prior to the moving of the controller handle, from neutral position to speed position. In other words, the latch is in such position that the controller drum can again be lowered from neutral position to any speed position.

Above I have specifically described the operation and traced the circuit which resulted from moving the controller from neutral position to low speed position, and from low speed position again to neutral. If the operator desires to pass from neutral to intermediate position, the circuits and operation are the same as that previously described, except that contacts 44ª and 44ᵇ engage respectively clips 46ª and 47ª, and selecting solenoid 36 is energized, and the selecting switch 39 is closed. If the operator desires to pass from neutral to reverse position, contacts 44ª and 44ᵇ are inserted respectively between the clips of contacts 46ᶜ and 47ᶜ. This causes the energization of selecting solenoid 36ª and the closure of selecting switch 39ª. This causes a movement of the shifter rods 30ᵇ and 30ª to the left, as the same are viewed in Fig. 1.

If the operator desires to pass from neutral to high speed, contacts 44ª and 44ᵇ will be inserted respectively between the clips 46 and 47. This results in the energization of selecting solenoid 36 and the closure of the motor circuit at selecting switch 39, the motor circuit thence being completed through a motor field winding 32ᶜ, resulting in the movement of the shifter rods 30 and 30ª to the right as the same are viewed in Fig. 1. The movement of the shifter rod 30, performs no useful function. It is required, however, in order that the circuit of the motor may be completed through the proper field winding. The motor circuit will be broken, and the motor will stop when contact 40ᵈ moves off the right hand end of contact strips 40ᵇ and 40ᶜ. This causes contact 40ʰ to bridge the contacts 40ᶠ and 40ᵍ of travel limit switch 40, and when the controller handle is again moved to neutral position, the motor circuit will be completed through field winding 32ᵇ, by the bridging of the controller contact strips 45 and 45ª, and by the bridging of the travel limit contact strips 40ᶠ and 40ᵍ. When the contact strip 40ʰ again reaches neutral position, all circuits will be broken, and the motor will stop.

The important function of the controller solenoid and of the latching mechanism is performed when the operator passes from one speed position to another, for by reason of this mechanism, the operator is enabled to pass from one speed position to any other speed position by simply moving the controller handle from one speed position to the other desired speed position, without stopping at neutral position.

When the operator moves the controller handle from one speed position to the other, the controller pin 41ʰ is moved from one of the speed slots 41ⁱ, (thus raising the controller to neutral position), and thence immediately drops into the slot 41ⁱ, corresponding to the speed desired. The controller drum 41ᶜ, however, does not at once move downwardly to the second speed position, for the latch 42 retains the drum in neutral position, until the motor restores the transmission and the transmission operating mechanism to neutral position. Whereupon, the latch is retracted, and the drum then drops to the speed position corresponding to the speed desired by the operator.

To explain this action, it may be said that when the drum is moved upwardly, as the operator moves the handle from one speed position to another, the latch which was previously free of the spring finger 43 and was previously bearing against the larger part of the drum, snaps inwardly beneath the shoulder 41$^m$. This latch then prevents the drum moving at once downwardly, although the controller handle is now in another speed position. As soon as the drum is moved upwardly as before stated, the controller solenoid is energized, and it is not until the solenoid is again deënergized by the breaking of all the circuits when the parts reach neutral position, that the spring finger 43 is in position to engage the shoulder 42$^b$ to retract the latch, whereupon the drum may drop to the proper speed position, which results in the motor moving the proper shifter rods and clutches corresponding to the positions in which the controller handle was previously moved. In other words, the operator moves the controller handle from one speed position to another, and without further attention or movement on his part, there is a sequence of operations performed by the apparatus, including first, the restoration of all parts to neutral position, followed by the movement of the proper shifter rods and transmission clutches, corresponding to the speed position to which the controller handle is moved.

In Fig. 6, I have shown an arrangement in which the shifter bar is operated by a magnet or solenoid, instead of by the rotary motor, screw and traveling nut. In this instance, the bar 34 is adapted to be shifted to the right and to the left by a shifter bar head 75, which replaces the traveling nut of the prior construction, and has a separable interlocking connection with the bar 34. This head 75 is adapted to be shifted in both directions by a double acting solenoid 76 having a single coil 76$^a$, and two plungers 76$^b$ and 76$^c$, which are drawn into the solenoid separately or individually when the latter is energized, and which move in opposite directions, one serving to move the shifter bar from neutral position to speed position at the left, or from speed position at the right to neutral position, and the other serving to move the shifter bar from neutral position to speed position at the right, or from speed position at the left, to neutral position. The two plungers are moved outwardly by coil springs 76$^d$ which surround the plungers and resist the inward movement. Locking connection is adapted to be made between the solenoid plungers and the bar operating head 75 by locking pins 77 which are mounted for movement in suitable sockets in heads or enlarged end portions of the plungers, the axes of the pins being at right angles to the axis of movement of the plungers, and at right angles to the head 75. The pins are normally pressed or urged partly out of the corresponding plunger heads, and out of engagement with the head 75 by coil springs 77$^a$ which surround said pins.

The head 75 is provided near its end with two sockets 78 which when the parts are in neutral position, are directly opposite or in alinement with the locking pins 77, each of which is adapted to be moved into one of the sockets when it is desired that the head be moved to a speed position in one direction or the other from neutral position. The head is provided also inwardly from the sockets 78 with notches 79 forming shoulders, one of which is adapted to be engaged by a locking pin when the head is to be moved from speed position at the left to neutral position, and the other of which is adapted to be engaged by the other locking pin when the head is adapted to be moved from speed position at the right to neutral position.

The locking pins 77 are selectively actuated, and the solenoid 76 is energized through the instrumentality of two auxiliary solenoids 80 and 80$^a$, which for convenience may be termed directional solenoids, and which are mounted on the ends of a base 81 to which the coil and housing of the main solenoid 76 are secured. These solenoids, each of which includes a winding 80$^b$ and a plunger 80$^c$ are so arranged with respect to the other parts of the apparatus that when in neutral position, the ends of the plungers 80$^c$ are directly in alinement with and are substantially in engagement with the ends of the locking pins 77, so that when the solenoid 80 or 80$^a$ is energized, in the manner hereinafter explained, its plunger moves the corresponding locking pin 77 toward the head 75, and causes the end of the pin to be inserted into the socket 78 or notch 79. Between the solenoids 80 and 80$^a$ and the enlarged head of the two main solenoid plungers 76$^b$ and 76$^c$ are movable retaining elements 82, each of which normally lies against the base of the corresponding solenoid, and has a tubular portion 82$^a$ which extends up into the solenoid coil. The plungers 80$^c$ have reduced inner or lower ends which extend into tubular portions 82$^a$ of the elements 82, and the ends of the locking pins likewise project outwardly from the sockets of the main solenoid plungers a short distance into said tubular portions of the retaining members 82. The parts are so arranged that when one of the directional solenoids is energized, the plunger 80$^c$ not only moves the corresponding pin into the socket of the shifter bar actuating head 75, but after a predetermined movement, it engages and shifts the retaining element toward the plunger of the solenoid 76 until the face of the element 82 is substantially flush with the face of the head at the end of the solenoid plunger. When the pin is in proper locking engagement with the head 75, the end of the pin which normally projects up into the element 82 is removed from such opening, so that the pin can be moved laterally along the face of the member 82. At the same time, the member 82 prevents the pin being retracted from the socket 78 or notch 79, until the circuits are broken, whereupon the plunger $80^c$ of the directional solenoid is retracted, and the pin, under the action of the spring $77^a$, lifts the member 82 until the opposite end of the pin is clear of the socket 78 or notch 79. The two directional solenoids 80 and $80^a$ control two directional switches 83, and $83^a$, each of which consists of a movable switch element which is carried by the plunger of the corresponding directional solenoid, and two contact points or terminals which are adapted to be bridged by said switch element.

With this shifter bar actuating mechanism which has just been described above, I employ a controller, a shifter rod selecting mechanism, travel limit switch and connections between said parts, which are precisely the same as in the arrangement shown in Fig. 1. Hence the detailed description of and the reference characters applied to the parts in Fig. 1, will suffice for the corresponding parts in Fig. 6.

It will be observed that conductor 62 in Fig. 6, as in Fig. 1, extends from the travel limit switch to the clutch pedal switch and to pedal latching solenoid which is connected to the negative side of the battery. It will be observed also that conductor 65 which in Fig. 1, is connected to the motor field winding $32^b$ and through the motor armature to the conductor 62, here, or in Fig. 6, is connected to one terminal of the winding of directional solenoid 80, and that conductor 66 which in Fig. 1 is connected to motor field winding $32^b$, and through the armature of the motor to conductor 62, is in Fig. 6 connected to one terminal of the winding of directional solenoid $80^a$. The other two terminals of the directional solenoids 80 and $80^a$ are connected to a common conductor 84, which is connected to the conductor 62. The conductor 65 is likewise connected to one terminal of directional switch 83, and conductor 66 is connected also to one terminal of directional switch $83^a$. The other two terminals of these switches are connected to a common conductor 85, to which one terminal of the winding of main solenoid 76 is connected. The other terminal of this solenoid winding is connected to conductor 84, which in turn is connected to conductor 62, as before stated.

From the above, it will be seen that when the operator moves the controller handle from neutral to low, intermediate, or reverse speed position, the proper shifter rod is connected through a selecting solenoid to a shifter bar and at the same time, solenoid 80 is energized, causing the corresponding pin 77 to be inserted in the socket 78, and selecting switch 83 is closed. This results in the energization of the solenoid 76, and a movement of solenoid plunger $76^b$ into the solenoid winding, causing the shifter bar and the shifter rods connected thereto to be moved to the left. After the proper movement, the travel limit circuit breaker or switch 40 breaks all circuits, resulting in the deënergization of the solenoids 80 and 76, whereupon the pin 77 is permitted to lift the retaining element 82, and ride out of the socket 78, and the plunger $76^b$ is restored by its spring to neutral position.

Prior to the opening of the circuits by the travel limit switch, the circuits for the directional and bar shifting solenoids were as follows: from the positive side of the battery through the controller solenoid $43^b$, constant service switch 53, through the proper selecting switch 39, $39^a$ or $39^b$, through one pair of clips $46^a$, $46^b$, or $46^c$, to conductor 65, from which current passes, through both the directional solenoid 80 and bar shifting solenoid 76, the current passing through the former by way of the conductor 84 to the conductor 62, and the current passing through the latter by way of directional switch 83, conductor 85, conductor 84, to conductor 62, which leads to the negative side of the battery.

When the circuits were broken by the travel limit switch after the bar shifting head was moved to the left, the head remained in that position, although the other parts were restored to normal position, causing the left hand notch 79 to be below the left hand pin 77. To restore the head to neutral position, the operator moves the controller handle to neutral position, whereupon directional solenoid $80^a$ and the solenoid 76 are both energized. This causes the plunger $76^c$ to be drawn to the right, and as the left hand pin 77 is then in position to engage the shoulder of the adjacent notch 79, the head 75 and shifter bar and parts connected thereto are restored to neutral position by being moved to the right. During said restoration to neutral position, current passed by way of conductor 66 through the directional solenoid $80^a$, to conductor 62, and from conductor 66 through directional switch $83^a$, through the winding of solenoid 76, and back to the conductor 62.

When the operator desires to pass from neutral to high speed position, the directional solenoid 80ª and the main operating solenoid 76 are energized, and the head is moved to the right, by reason of the locking connection between the plunger 76ᶜ and the head 75. The parts may be restored from high speed position to neutral by the proper movement of the controller which causes the energization of the directional solenoid 80, and the main operating solenoid 76, resulting in the locking connection between the plunger 76ᵇ and the head,—the locking pin then engaging in the adjacent notch 79.

The operator may also pass from one speed position to another, the main operating solenoid and one of the directional solenoids being energized first to cause the parts to be restored from speed position to neutral position, and thence after all circuits are broken, there immediately follows the energization of one of the directional solenoids and of the main operating solenoid to shift the parts to speed position, to the left or to the right, depending upon the particular speed selected by the operator.

Having thus described my invention, what I claim is:

1. In combination with driving and driven members, a variable speed transmission between said members comprising shiftable power transmitting elements, electric motive means for shifting said power transmitting elements, selecting mechanism for forming operative connections between the motive means and the elements to be shifted and means controlling the motive means and selecting mechanism.

2. In combination with driving and driven members, a variable speed transmission between said members comprising shiftable power transmitting elements, motive means for shifting said power transmitting elements, and electrically controlled selecting mechanism for forming operative connections between the motive means and the elements to be shifted.

3. In combination with driving and driven members, variable speed transmission between said members and comprising shiftable power transmitting elements, motive means for shifting said power transmitting elements, electrically operated selecting mechanism for connecting and disconnecting the motive means and certain of said elements, and means for controlling the selecting mechanism.

4. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, and electrically controlled means for establishing driving relationship between the motor and different shifting devices.

5. In combination with driving and driven members, a variable speed transmission betwen said members comprising a plurality of shiftable power transmitting elements adapted to cause changes in speed relationship between the driving and driven members, devices for shifting said power transmitting elements, a motor for shifting said devices, electrically operated means for establishing driving relationship between the motor and the shifting devices, and means under the control of the operator for controlling the motor and said selecting mechanism.

6. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, and electrically operated means selectively connecting different shifting devices to the motor.

7. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, and a selecting mechanism comprising a plurality of magnets for connecting the different shifting devices to the motor.

8. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, a selecting mechanism by which only the devices to be shifted are connected to the motor, said mechanism comprising a plurality of magnets, a source of current, and means for connecting the motor and for selectively connecting the magnets to the source of current.

9. In combination with driving and driven members, a variable speed transmission between said members comprising a plurality of shiftable power transmitting elements adapted to cause changes in speed relationship between the driving and driven members, devices for shifting said power transmitting elements, a motor for shifting said devices, a selecting mechanism comprising a plurality of magnets for connecting the different shifting devices to the motor, a source of current, means comprising a manually operable controller for connecting the motor and for selectively connecting the different magnets to the source of current, and means for stopping the motor and for deenergizing the magnets.

10. In combination with driving and driven members, variable speed transmission between said members comprising a plurality of shiftable power transmitting elements adapted to cause changes in speed relationship between the driving and driven members, devices for shifting said power transmitting elements, a motor for shifting said devices, a selecting mechanism comprising a plurality of magnets for connecting different shifting devices to the motor, a source of current, means comprising a manually operable controller for connecting the motor and for selectively connecting the different magnets to the source of current, and means independent of the controller for stopping the motor and for deënergizing the magnets after a predetermined movement of the power transmitting devices.

11. In combination with driving and driven members, a variable speed transmission including movable power transmitting elements adapted to be shifted to cause various speed relationships between the driving and driven members, a motor for shifting said power transmitting devices, means comprising a controller for controlling the starting of the motor, and a motor operated switch for stopping the motor after a predetermined movement thereof.

12. In combination with driving and driven members, a variable speed transmission including movable power transmitting elements adapted to be shifted to cause various speed relationships between the driving and driven members, a motor for shifting said power transmitting devices, locking elements for connecting said devices to the motor, magnets for shifting said locking elements, means comprising a controller for controlling the energization of said magnets and the starting of the motor, and means comprising a motor operated switch for stopping the motor, and for deënergizing the magnets after a predetermined movement of the motor.

13. In combination with a driving shaft adapted to be clutched to a prime mover, a clutch operating member, a driven shaft, a variable speed transmission between the driving and driven shafts, comprising a plurality of shiftable power transmitting elements adapted to be shifted to cause changes in speed relationship between the driving and driven shafts, a motor for shifting said elements, a selecting mechanism for connecting different elements to the motor, a source of current, and means for completing the circuit through the source and motor and for controlling the selecting mechanism comprising a manually movable controller, and a switch which is closed by the movement of the clutch operating member to unclutch the driving shaft from the prime mover.

14. In combination with a driving shaft adapted to be clutched to a prime mover, a clutch operating member, a driven shaft, a variable speed transmission between the driving and driven shafts, comprising a plurality of shiftable power transmitting elements adapted to be shifted to cause changes in speed relationship between the driving and driven shafts, a motor for shifting said elements, a selecting mechanism for connecting different elements to the motor, a source of current, and means for completing the circuit through the source and motor and for controlling the selecting mechanism, comprising a manually movable controller, means for preventing completion of the circuit of the motor and source of current unless the driving shaft is unclutched from the prime mover, and means for preventing the clutching of said parts until after a predetermined motor movement.

15. In combination with a driving shaft adapted to be clutched to a prime mover, a clutch operating member, a driven shaft, a variable speed transmission between the driving and driven shafts, comprising a plurality of shiftable power transmitting elements adapted to be shifted to cause changes in speed relationship between the driving and driven shafts, a motor for shifting said elements, a selecting mechanism for connecting different elements to the motor, means for controlling the motor and selecting mechanism comprising a manually operable controller, and a clutch pedal switch which is closed when the clutch pedal is depressed to unclutch the driven shaft and prime mover, and a clutch pedal lock for preventing the clutching of the driven shaft and prime mover until after a predetermined movement of the motor.

16. In combination with driving and driven members, a variable speed transmission between said members, comprising movable power transmitting elements, a motor, a motor driven member for shifting said elements, and electrically operated means for selectively connecting the power transmitting elements to and disconnecting them from said motor driven member.

17. In combination with driving and driven shafts, a variable speed transmission between said shafts comprising movable power transmitting elements, shifting devices operatively connected to said elements, a motor, a member adapted to be driven by said motor, and electrically controlled means for selectively connecting said member to or disconnecting it from said devices.

18. A gear selecting indicator, comprising, in combination with a plurality of elements each adapted to be shifted from an inactive position into either one of two active positions, means for selecting the element, and means for indicating the active position of each element and the inactive positions of all the elements, each indicated active position being followed by an indicated inactive position.

19. A gear selecting indicator comprising, in combination with a plurality of elements adapted to be shifted from active into inactive positions and vice versa, means adapted to indicate said various positions, the indicated inactive positions alternating with the indicated active positions.

20. A gear selecting indicator comprising, in combination with a plurality of elements of a machine adapted to be shifted from inactive into a variety of active positions, means for selecting the various positions, and means for indicating the positions, the indicated inactive positions alternating with the indicated active positions.

21. A gear selecting indicator comprising, in combination with a plurality of elements, each adapted to be shifted from an inactive into either one of two active positions, means for selecting the various active and inactive positions of the elements, and means for indicating said positions in a single progressive succession.

22. A gear selecting indicator comprising, in combination with a plurality of elements each adapted to be shifted from an inactive into either one of two active positions, means adapted to select a change of position, and means adapted to indicate the selected change and the nature of the change, whether from active into inactive or the reverse in a single progressive succession.

In testimony whereof, I hereunto affix my signature in the presence of two witnesses.

ERNEST F. WACKWITZ.

Witnesses:
L. I. PORTER,
A. F. KWIS.